(No Model.) 2 Sheets—Sheet 1.
R. CONRADER.
OIL FILTERING APPARATUS AND PROCESS.
No. 559,439. Patented May 5, 1896.
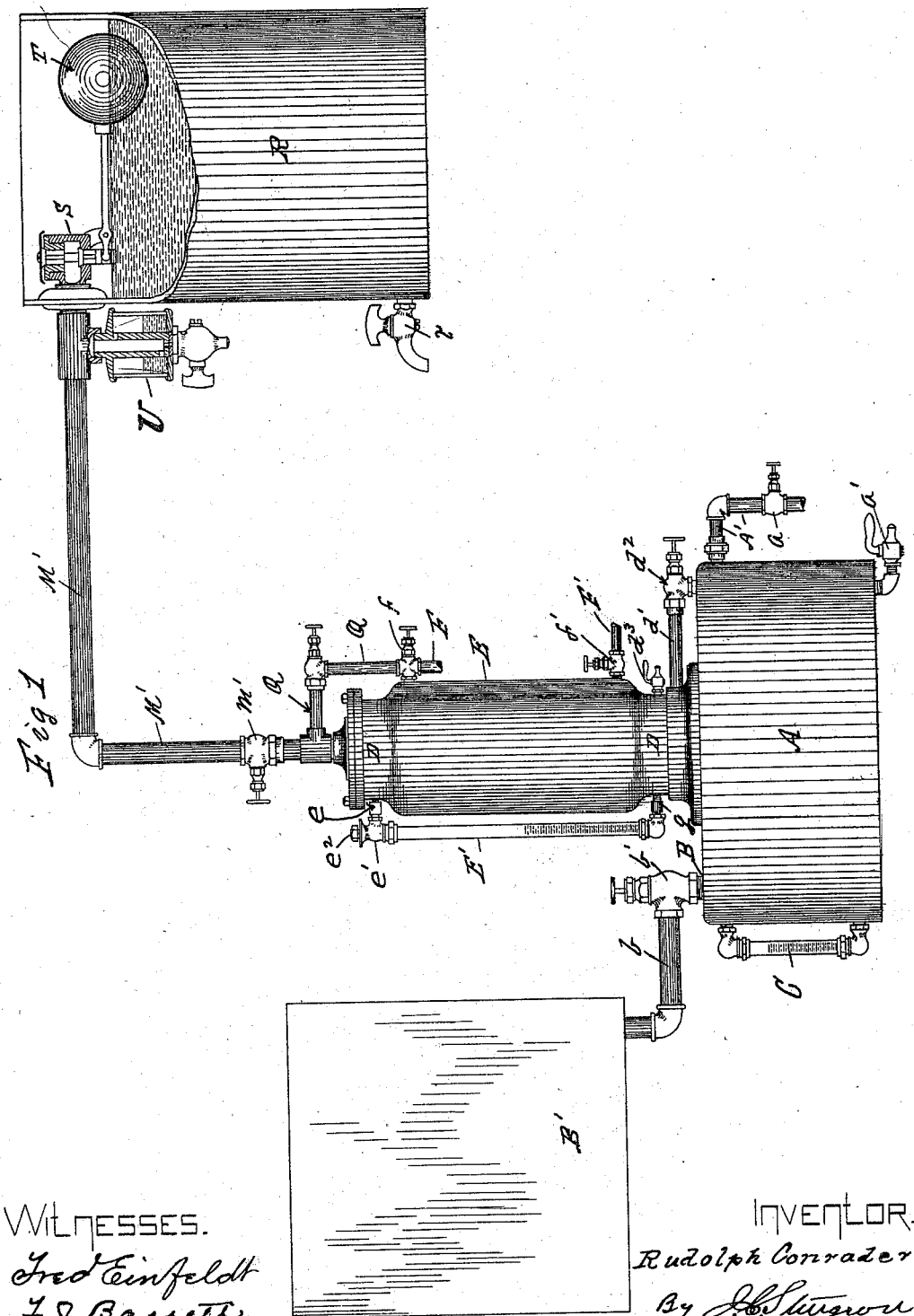
WITNESSES.
Fred Einfeldt
F. J. Bassett
INVENTOR.
Rudolph Conrader
By J. C. Sturgeon
Atty (No Model.) 2 Sheets—Sheet 2.
R. CONRADER.
OIL FILTERING APPARATUS AND PROCESS.
No. 559,439. Patented May 5, 1896.
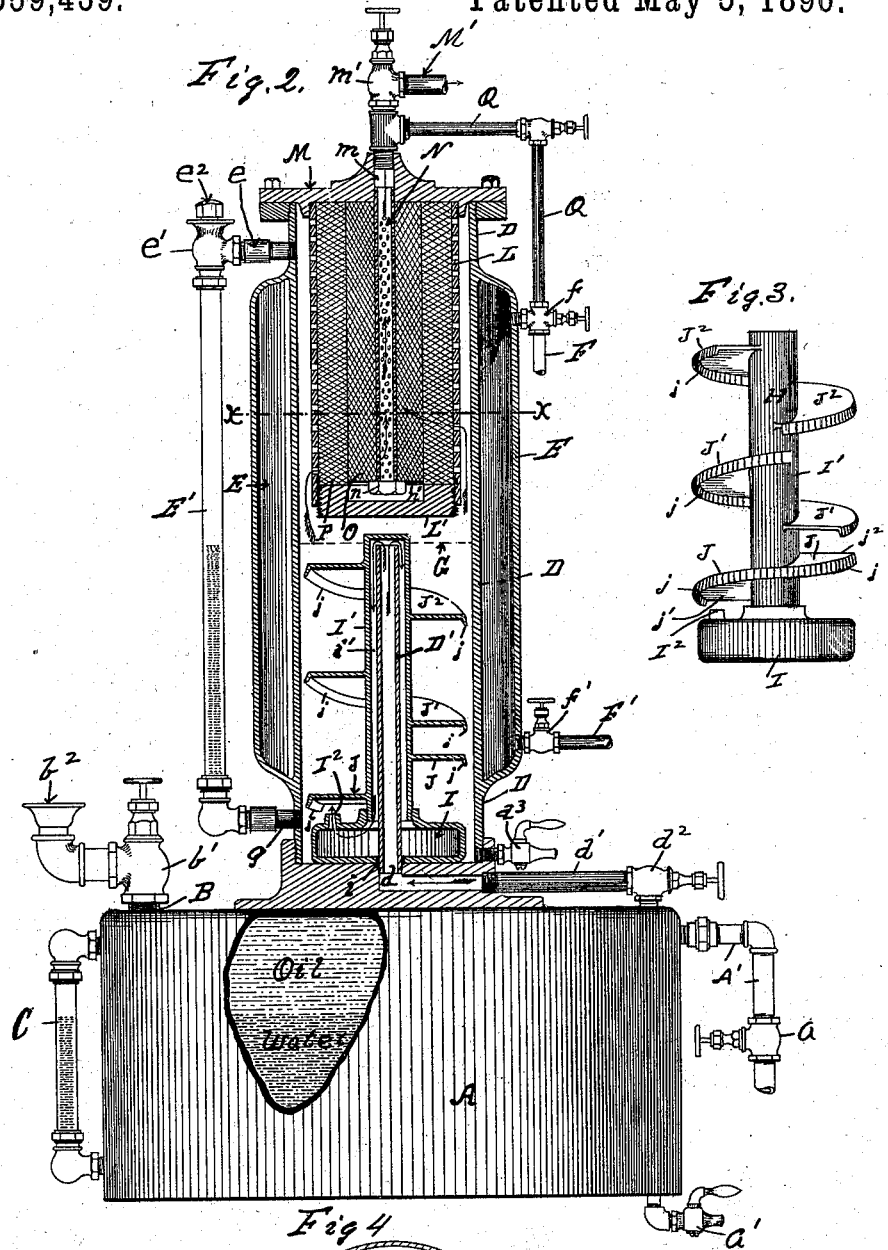
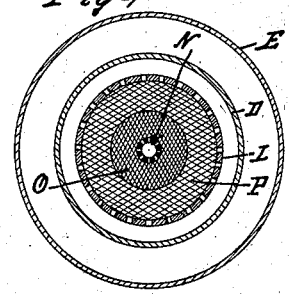
WITNESSES.
Fred Einfeldt
F. J. Barrett
INVENTOR.
Rudolph Conrader
By J. H. Sturgeon
atty.

UNITED STATES PATENT OFFICE.

RUDOLPH CONRADER, OF ERIE, PENNSYLVANIA.

OIL-FILTERING APPARATUS AND PROCESS.

SPECIFICATION forming part of Letters Patent No. 559,439, dated May 5, 1896.

Application filed April 22, 1895. Serial No. 546,653. (No model.)

*To all whom it may concern:*

Be it known that I, RUDOLPH CONRADER, a citizen of the United States, residing at the city of Erie, in the county of Erie and State of Pennsylvania, have invented certain new and useful Improvements in Oil-Filtering Apparatus and Processes; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in a filtering apparatus and process for cleansing and purifying lubricating-oils that have become charged with foreign substances by reason of their having been used to lubricate journals on screw-cutting machinery and for other purposes; and it consists in the improvements in the oil-filtering apparatus and process hereinafter set forth and explained, and illustrated in the accompanying drawings, in which—

Figure 1 is a view in elevation of my improved oil-filtering apparatus. Fig. 2 is a view of the filtering mechanism thereof, partially in elevation and partially in section. Fig. 3 is a detail view in elevation of a portion thereof. Fig. 4 is a transverse section of the filter portion of the mechanism on the line $x$ $x$ in Fig. 2.

My invention primarily consists in the construction of an effective mechanism which will accomplish the desired end by forcing the oil through a suitable porous filtering material and finally delivering the purified oil into a suitable tank, and this result I accomplish by so constructing my filter that the oil is automatically forced onward on its traverse during the process of filtering it by means of a continuous pressure either of water or wet steam, as may be required by the character of the oil being filtered.

Other features of my invention consist in the novel construction and combination of the parts of my improved oil-filtering apparatus, as hereinafter described and claimed.

In the accompanying drawings, illustrating my invention, A is a closed tank, constructed of sufficient strength to resist considerable water or steam pressure, and A' is a pipe provided with a suitable shut-off cock $a$, entering said tank and adapted to be connected to a water-main or other source from which water can be supplied under pressure or to a source for supplying wet steam under pressure. $a'$ is a waste-cock for emptying said tank. In the top of the tank A is an inlet B, through which oil can be delivered into the tank A from a supply-tank B' through a pipe $b$, as illustrated in Fig. 1, or it can be poured into the tank A through the funnel $b^2$ into the inlet B, as illustrated in Fig. 2, as may be desired, the cock $b$ shutting off the supply and closing the inlet B. On one side of the tank A is an ordinary glass C for showing the relative amounts of oil and water in the tank A.

Secured to the top of the tank A is an upright cylinder D, in the center of the base of which is secured an upright tube D', and from the bottom of the tube D' is a passage $d$, from which a pipe $d'$ extends into the top of the tank A, this pipe being provided with a shut-off cock $d^2$, and in one side of the base of the upright cylinder D is a waste-cock $d^3$ for emptying said cylinder. The cylinder D is preferably made with an annular steam chamber or jacket E surrounding it, by means whereof steam heat can be applied to the oil being filtered, as hereinafter described. This steam-jacket E is provided with suitable steam inlet and outlet pipes F and F', adapted to connect with a suitable source of steam supply, and also with shut-off cocks $f$ and $f'$. In the upper part of the cylinder D there is a pipe $e$, provided with a T $e'$, the upper arm of which T is closed by means of a screw-plug $e^2$, and through which opening water may be poured into the cylinder D until it is filled substantially up to the dotted line G in Fig. 2. A water-glass E extends from the lower part of the T $e'$ to a suitable connection $g$ with the bottom of the cylinder D, so that the height of the water therein can be readily seen.

In the cylinder D, I place the oil separating and washing device H. (Illustrated in Fig. 4.) This device H consists of an annular chamber I, having an opening $i$ in the bottom thereof just large enough to pass down over the tube D', secured in the bottom of the upright cylinder D, and in the top of the chamber I is secured a tube I', somewhat larger in its inside diameter than the outside of tube D', so as to leave an annular passage $i'$ between said tubes. The upper end of the tube I' is also closed, so that oil passing up through the tube D' must pass down again through the annular passage $i'$ into the chamber I, from whence it passes out of a small aperture I² in the top of one side of the chamber I, as illustrated by the arrows in Fig 2. On the outside of the tube I' is secured a broken spiral flange made in sections J, J', and J². Each section thereof has on its outer edge a downwardly-projecting flange $j$, the lower end $j'$ of the section J covering the aperture I² in the chamber I, so that oil passing out of said aperture will rise through the water up against the under side of the spiral J, and being retained thereon by the flange $j$ will pass around until it reaches the upper end $j^2$ of the spiral J, which is under the lower end of the spiral J', and as it leaves the upper end of the spiral J it rises up through the water until it strikes the under side of the spiral J', along which it travels until it likewise rises up under the lower end of the spiral J², along which it travels until it passes out from under the upper end of the spiral J², and thence rises to the top G of the water in the cylinder D.

In the top of the cylinder D, I place a filtering device, preferably consisting of a perforated outer cylinder L, secured at its upper end to the under side of a cap M, which is firmly secured to the top of the cylinder D. In the lower end of the perforated cylinder L is firmly screwed a disk L', and in the center of the cap M, I make an opening $m$, in the upper end of which I screw a discharge-pipe M', and in the lower end thereof I screw a perforated tube N, which extends downward nearly to the bottom of the perforated cylinder L. The lower end of said tube is also closed by means of a cap-nut $n$, which also secures a washer $n'$ against the lower end of a portion of the filtering material. Between the perforated cylinder L and the perforated tube N, I place filtering material, preferably in two layers O and P. This filtering material may be of a fibrous nature, such as candle-wicking or felt, compressed therein by the disk L' and washer $n'$, or such as porous clay properly burned, if desired, as any suitable filtering material may be used; and as the oil rises above the water-line G and fills up around the perforated cylinder L it passes through the filtering material O P into the perforated tube N and out through the discharge-pipe M', and thence to a storage tank R. The end of the discharge-pipe M' inside of the tank R is provided with a balanced valve S, to which is secured a float T, which, when the tank is filled to the proper level, operates on the valve S to close the end of the discharge-pipe M and automatically, by means of the back pressure thereby produced, stop the operation of the filtering mechanism until a portion of the filtered oil is withdrawn from the tank R, a faucet $r$ being provided for that purpose.

For cleaning the filtering material O P, I provide a steam-pipe connection Q between the pipe F and the outlet-pipe M, when by closing the cock $m'$ in the outlet-pipe M and closing the cock $d^2$, and then drawing off the contents of the cylinder D through the waste-cock $d^3$, on turning steam down into the perforated tube N it will be forced outward through the filtering material O P and thoroughly cleanse it from impurities deposited by the process of filtering the oil, after which water is again placed in the cylinder D and the cocks opened and the washing and filtering process is resumed.

In the discharge-pipe M', near the storage tank R, I place a sight-glass U. The glass U is constructed with a central tube which extends down to the bottom of the glass, which tube is provided with a lateral opening near the top of the glass and an opening near the bottom of the glass; and in operation, when oil alone is flowing through the pipe M', the glass U is always normally full of oil, but when any water commences to flow through the pipe M' it at once finds its way down through the central tube in the glass and out of the opening in the bottom thereof, displacing a like amount of the oil in the glass, which flows out through the opening in the upper part of the tube, until all of the oil in the glass is displaced by water, thus giving notice to the operator that the tank A is empty and needs replenishing.

In operation, the tank is first nearly filled with the oil to be filtered, and the cylinder D is preferably also filled with water, substantially up to the line G. The oil-supply opening B to the tank A is then closed, and the cock $a$ is then opened, and through the pipe A' water or wet steam, according to the nature of the oil to be filtered, is let into the tank A under considerable pressure. This, from its greater gravity, settles to the bottom of the tank A and gradually forces the oil therein up through the pipe $d'$ and passage $d$ and tube D' and down through the annular passage $i'$ into the tank I, and out of the aperture I², thence up under the spiral J, from which it passes up through the water in the upright cylinder D if water is used therein, under the spirals J' and J², and finally rises above the water-line G, until it fills the space above it and around the perforated cylinder L sufficiently to be forced through the filtering material O P, and out through the discharge-pipe M' and into the tank R, until the tank R is filled sufficiently to close the valve S, when, the pressure being equalized throughout the entire machine, the filtering process ceases until the valve S is again opened and the back pressure relieved, when the device again automatically resumes its operation, and continues until the oil is exhausted from the tank A, when by closing the cocks $d^2$ and

*a* and opening the waste-cock *a'* the water is run out of the tank, and it is again filled with oil, as before.

In the drawings and foregoing description I have shown and described a convenient mechanism for utilizing my invention, the primary feature of which is the operation of an oil-filter by means of a continuous water or steam pressure acting upon the oil to be filtered throughout the entire process, and therefore, Having described my invention so as to enable others to construct and use the same, what I claim as new, and desire to secure by Letters Patent of the United States, is—

1. An oil-filtering apparatus, consisting of a closed tank having an opening in the top thereof and adapted to be filled with oil to be filtered, a pipe communicating with said tank and connected with a means for supplying water or steam thereto under pressure, and a filtering mechanism so connected with the opening in the top of the tank, that the pressure of the water or steam supplied to the tank will force the oil out of the tank and through the filtering mechanism, substantially as and for the purpose set forth.

2. The combination in an oil-filtering apparatus, of a closed tank having an opening in the top thereof, and adapted to be filled with oil to be filtered, a pipe communicating with said tank and connected with means for supplying water or steam thereto under pressure, a closed chamber communicating with said opening in the top of said tank, a water-space in the lower part of said chamber, filtering material in the upper part thereof, and an opening in the upper part thereof for the discharge of oil after it has passed through the filtering material therein, substantially as and for the purpose set forth.

3. The combination in an oil-filtering apparatus, of a closed tank adapted to be filled with oil to be filtered, a pipe connecting with said tank and supplying water or steam thereto under pressure, a closed chamber and a pipe connecting the top of said tank with said chamber and terminating in an aperture opening therein, and a filtering material within said chamber through which the oil is forced, and finally discharged from said chamber by means of the pressure exerted upon the oil in said closed tank, substantially as and for the purpose set forth.

4. The combination in an oil-filtering apparatus, of a closed tank adapted to be filled with oil to be filtered, a pipe connecting with said tank and supplying water or steam thereto under pressure, an inclosed chamber connected with said tank adapted to be partially filled with water, an oil separating and washing device submerged in the water within said chamber, a connection between the upper part of said tank and said separating and washing device in said chamber, filtering material in the upper part of said chamber, and a pipe for discharging the oil after it has passed through said filtering material, substantially as and for the purpose set forth.

5. The combination in an oil-filtering apparatus, of a closed tank adapted to be filled with oil to be filtered, a pipe connecting with said tank and supplying water or steam thereto under pressure, an inclosed chamber on said tank adapted to be partially filled with water, an oil-distributer submerged in the water in said chamber, a pipe extending from said chamber up into said oil-distributer, a filtering device in the upper part of said closed chamber, and a discharge-pipe leading from said filtering device, substantially as and for the purpose set forth.

6. A distributing device for oil-filters, consisting substantially of an upright pipe closed at the upper end, a chamber at the base of said pipe, a worm-thread around said upright pipe, a downwardly-projecting flange on the periphery of said worm-thread, and an opening in the top of said chamber under the end of the lower section of said worm-thread, substantially as and for the purpose set forth.

7. The combination in an oil-filtering apparatus, of a closed tank having an opening in the top thereof, and adapted to be filled with oil to be filtered, a pipe communicating with said tank, and connected with means for supplying water or steam to said closed tank under pressure, a closed chamber, an oil-distributer in the lower part, and a filtering device in the upper part of said closed chamber, and a connection between the opening in the top of said tank and the lower part of said closed chamber, so that the pressure of the water or steam in said tank will force the oil out of the top of said tank and up through the distributing and filtering mechanism in said closed chamber, substantially as and for the purpose set forth.

8. The combination in an oil-filtering apparatus, of a closed tank adapted to be filled with oil to be filtered, a pipe connecting said tank with a water or steam supply under pressure, a storage tank connected with said closed tank for supplying oil thereto, an inclosed chamber connected with the upper part of said closed tank and adapted to be partially filled with water, an oil-distributing device submerged in the water in said chamber, a filtering device in the upper part of said chamber above the water-line thereof, a discharge-pipe leading out of said chamber from the filtering device therein, a storage tank connected with said discharge-pipe, an automatic valve mechanism in said storage tank and a float mechanism connected with said valve for opening and closing it, substantially as and for the purpose set forth.

In testimony whereof I affix my signature in presence of two witnesses.

RUDOLPH CONRADER.

Witnesses:
 FRED EINFELDT,
 H. J. CURTZE.